United States Patent [19]
Suzuki

[11] Patent Number: 5,218,596
[45] Date of Patent: Jun. 8, 1993

[54] OPTICAL DISC APPARATUS HAVING A PARTICULAR LASAR SOURCE ORIENTATION

[75] Inventor: Masayuki Suzuki, Yokohama, Japan

[73] Assignee: Victor Company of Japan, Ltd., Yokohama, Japan

[21] Appl. No.: 691,964

[22] Filed: Apr. 26, 1991

[30] Foreign Application Priority Data

Apr. 27, 1990 [JP] Japan .................. 2-112940
Feb. 25, 1991 [JP] Japan .................. 3-53307

[51] Int. Cl.$^5$ .................................. G11B 7/135
[52] U.S. Cl. .................................. 369/118; 369/112; 369/44.23
[58] Field of Search .......... 369/118, 112, 13, 110, 369/44.23, 44.14

[56] References Cited

U.S. PATENT DOCUMENTS

| | | | |
|---|---|---|---|
| 4,549,287 | 10/1985 | Hatono et al. | 369/45 |
| 4,881,216 | 11/1989 | Deguchi et al. | 369/54 |
| 5,070,494 | 12/1991 | Emoto et al. | 369/112 |
| 5,115,423 | 5/1992 | Maeda et al. | 369/112 |
| 5,121,378 | 6/1992 | Hirose et al. | 369/112 |

FOREIGN PATENT DOCUMENTS 57-12188 3/1982 Japan .
3-10318 1/1991 Japan .

OTHER PUBLICATIONS

ISO/IEC JTC1 Information Technology SC23, "Optical Digital Disks", pp. 73 and 74, published on Mar. 16, 1990.
Abstract of the JP-3-22235 (A) Magneto-Optical Disk Recording and Reproducing Device, Jan. 30, 1991 Masayuki Suzuki.
Abstract of the JP-3-2236 (A) Small-Sized Magneto-Optical Disk Device Jan. 30, 1991 Yasuo Hachi(3).

*Primary Examiner*—Paul M. Dzierzynski
*Assistant Examiner*—Jim Beyer
*Attorney, Agent, or Firm*—Jacobson, Price, Holman & Stern

[57] ABSTRACT

An optical disc apparatus having a semiconductor laser (7), and a beam splitter (11) which guides a laser light emitted from the semiconductor laser to an optical disc (2) and also guides a laser light reflected from the optical disc (2) to a detection system for detecting information carried by the reflected light. The optical disc apparatus comprises an optical axis direction change device (10) provided between the semiconductor laser (7) and the beam splitter (11) for changing the direction of the laser light emitted from the semiconductor laser, wherein, the angle ($\theta$) between the optical axis of the laser light emitted from the semiconductor laser and the laser light reflected from the optical disc is less than 90°.

12 Claims, 3 Drawing Sheets

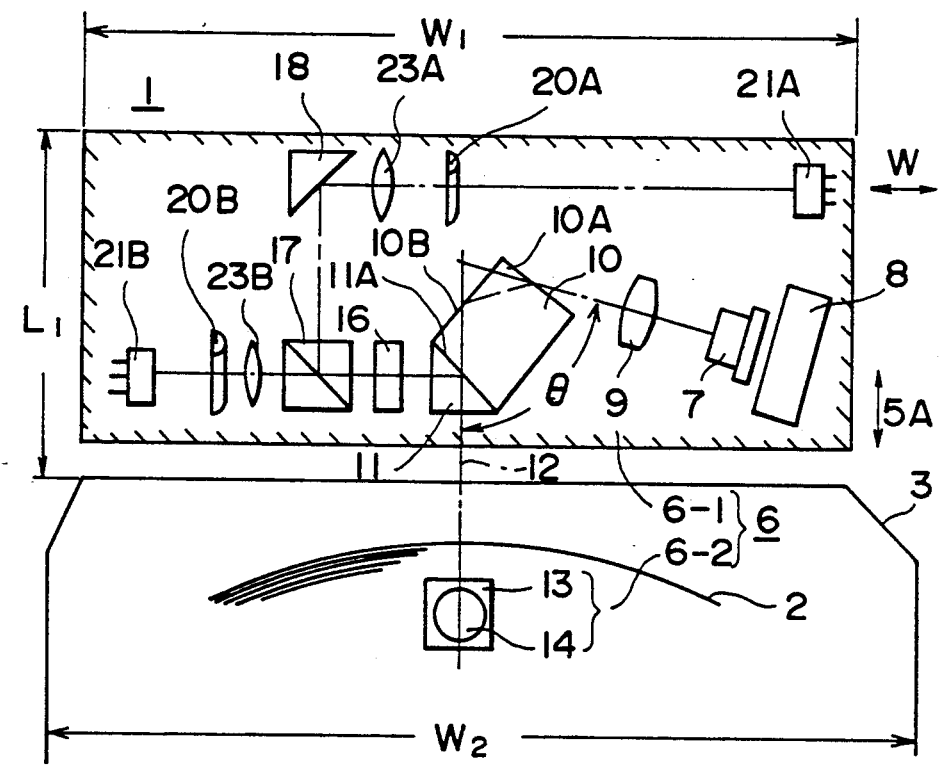
F I G . 3

OPTICAL DISC APPARATUS HAVING A PARTICULAR LASAR SOURCE ORIENTATION

BACKGROUND OF THE INVENTION

The present invention relates to an optical disc apparatus such as an opto-magnetic disc apparatus for recording and reproducing information by a light beam.

In general, laser recording and reproduction apparatus (hereinafter termed optical pickups) used in the opto-magnetic disc apparatus have a complex optical system for signal detection and thus become too heavy in weight for high speed data access.

There is known a separate type of optical system in which an objective lens, an actuator to drive it, and a prism for guiding the light beam to the objective lens and the like configure a feed mechanism, that is a movable unit which moves in the direction of the radius of a disc while other portions of the optical pickup comprise a fixed unit which is fixed to a base of a disc apparatus so that it is possible for the weight of the movable unit to be greatly reduced and so that the access time and the power consumption when there is access are both reduced.

FIG. 1A and 1B are configuration diagrams showing one example of a conventional opto-magnetic disc apparatus, with FIG. 1A being a side view, and FIG. 1B being a plan view.

As is shown in the figures, an opto-magnetic disc apparatus 31 of the conventional type is configured from an opto-magnetic disc 2 housed in a cartridge 3, a feed apparatus 5, a base 34, an optical pickup 36 and the like.

As is shown in FIG. 1A, a laser beam 12 that is irradiated from a fixed unit 36-1 of the optical pickup 36 fixed to the base 34, is irradiated to a moving unit 6-2 of the optical pickup 36 and which can move in the direction shown by an arrow 5A due to the feed apparatus 5, has its direction changed to the direction perpendicular to it's original direction by a guiding prism 13, is focussed by an objective lens 14, and is irradiated to the opto-magnetic disc 2 in the 'just-focussed' status by an objective lens drive actuator 15.

In the separate type of optical system in such opto-magnetic disc apparatus 31, the configuration is such that the direction of motion shown by the arrow 5A (the feed direction) of the moving unit 6-2 and the optical axis of the laser beam 12 irradiated from the fixed unit 36-1 must always be kept in parallel with each other and this imposes a significant restriction on the optical path design of the optical pickup 36.

As shown in FIG. 1B, when there is reproduction, the light beam irradiated from a semiconductor laser 7 undergoes high-frequency modulation at the high-frequency superimposing circuit 8 that is disposed to the rear of the semiconductor laser 7, and after it has been collimated by a collimator lens 9, is irradiated to a beam shaping prism 40. The light beam irradiated from the semiconductor laser 7 has a cross section that is approximately elliptical in shape and this cross section is shaped into an approximately circular shape by the beam shaping prism 40. The light beam so shaped is irradiated via a beam splitter 11, to the guiding prism 13, where it is reflected and guided to the objective lens 14. The objective lens 14 then focuses the light beam to the opto-magnetic disc 2.

The light that is reflected from the opto-magnetic disc 2 is irradiated via the objective lens 14 and the guiding prism 13 to the beam splitter 11 where it is reflected by a splitting surface 11A and irradiated in the direction of a signal detection system. More specifically, this reflected light beam passes through a ½ wavelength plate 16 and then one portion of it is reflected by a polarizing beam splitter 17, passes through a total reflection prism 18, a condenser lens 19A and a cylindrical lens 20, is converted into an electrical signal by a four-divided photodiode 21A and is outputted a detection signal. On the other hand, the remaining portion of the light beam passes through the polarizing beam splitter 17, condenser lens 19B, is converted into an electrical signal by a four-divided photodiode 21B and is outputted as another detection signal. And a reproduced RF signal is obtained as the difference between them. These photo-diodes 21A and 21B are configured so that they are both arranged on the same side inside the fixed unit 36-1.

In a separate type of optical system described above, (i) the moving unit 6-2 must not interfere with the fixed unit 36-1 even if it moves to the outermost portion of the opto-magnetic disc 2, (ii) the optical system must be adjustable even though the disc 2 is mounted and and (iii), the moving direction of the moving unit 6-2 shown by the arrow 5A must be parallel with the optical axis of the laser beam 12 that is irradiated from the fixed unit 36-1. Therefore as is clear from FIG. 1B, the fixed unit 36-1 must protrude from at least one direction from the disc 2 or the cartridge 3. For example, in the example shown in the figure, the fixed unit 36-1 protrudes with respect to the cartridge 3 by the dimension $L_3$ in the direction of motion shown by the arrow 5A.

Accordingly, as is clear from the figure, an optomagnetic disc apparatus 31 using such a separated type of optical system cannot have the length in the direction of motion shown by the arrow 5A made shorter than the diameter of the opto-magnetic disc 2 (or the length of the cartridge 3) to which the length $L_3$ of the amount of protrusion from the fixed unit 36-1 has been added.

Furthermore, the width of the opto-magnetic disc apparatus 31 in the direction of width shown by an arrow W perpendicular to the direction of motion shown by the arrow 5A must have the length longer than the diameter of the opto-magnetic disc 2 (or the width $W_2$ of the cartridge 3) and the width $W_3$ of the fixed unit 36-1.

In consideration of this design condition, this opto-magnetic disc apparatus 31 is configured so that the width $W_3$ of the fixed unit 36-1 is less than the width $W_2$ of the cartridge 3 and as shown in FIG. 1B, so that the right surface of the fixed unit 36-1 is within the surface of the right side of the cartridge 3.

On the other hand, in order to improve the accuracy of the focus servo operation by the astigmatism method, as is known, it is advantageous to have a large focal length for the condenser lens 19A described above, in order to focus to the ¼ photodiode 21A.

However, this design condition for a conventional optical disc apparatus 31 having the configuration described above cannot have a large focal length for the condenser lens 19A and so there is the problem that the focus servo operation has a poor accuracy.

BRIEF SUMMARY OF THE INVENTION

In the light of this, the present invention has as an object the provision of an optical disc apparatus that can be made compact and that has high accuracy focus operation.

An optical disc apparatus of the present invention has a semiconductor laser, a beam splitter which guides a laser light emitted from the semiconductor laser to an optical disc and also guides a laser light reflected from the optical disc to a detection system for detecting information carried by the reflected light.

The optical disc apparatus comprises change means provided between the semiconductor laser and the beam splitter for changing the direction of the laser light emitted from the semiconductor laser, wherein, the angle between the optical axis of the laser light emitted from the semiconductor laser and the laser light reflected from the optical disc is less than 90 degrees.

An optical disc apparatus having the configuration described above can have a fixed unit of a laser recording reproduction apparatus made compact and so that the entire apparatus can be made compact.

The other objects and features of this invention will become understood from the following description with reference to the accompanying drawings.

BRIEF DESCRIPTION OF THE DRAWINGS

FIG. 3 is a view similar to FIG. 2B which shows the configuration of an optical disc apparatus of another preferred embodiment of the optical disc apparatus according to the present invention.

DETAILED DESCRIPTION OF THE PREFERRED EMBODIMENTS

Figure 1A:
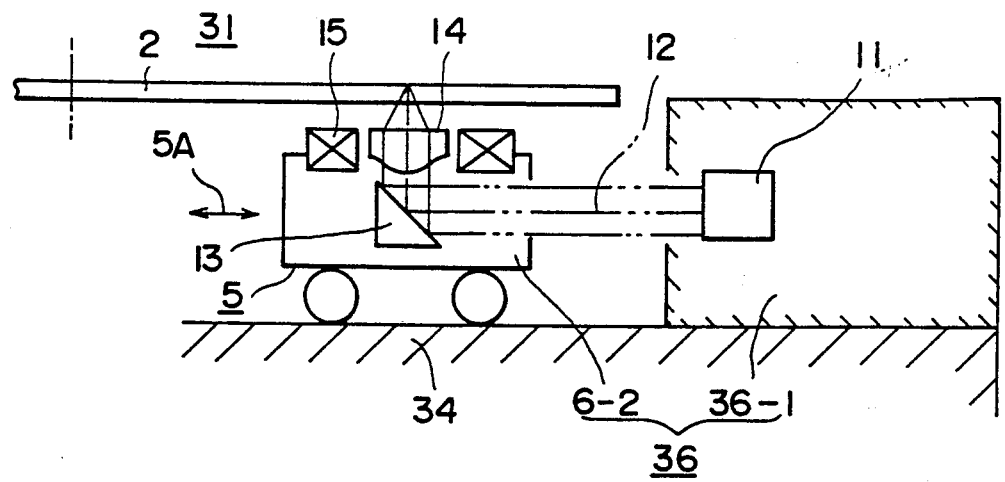
FIG. 1A and FIG. 1B are schematic side and top plan views, respectively, showing the configuration of one example of a conventional optical disc apparatus.
Figure 1B:
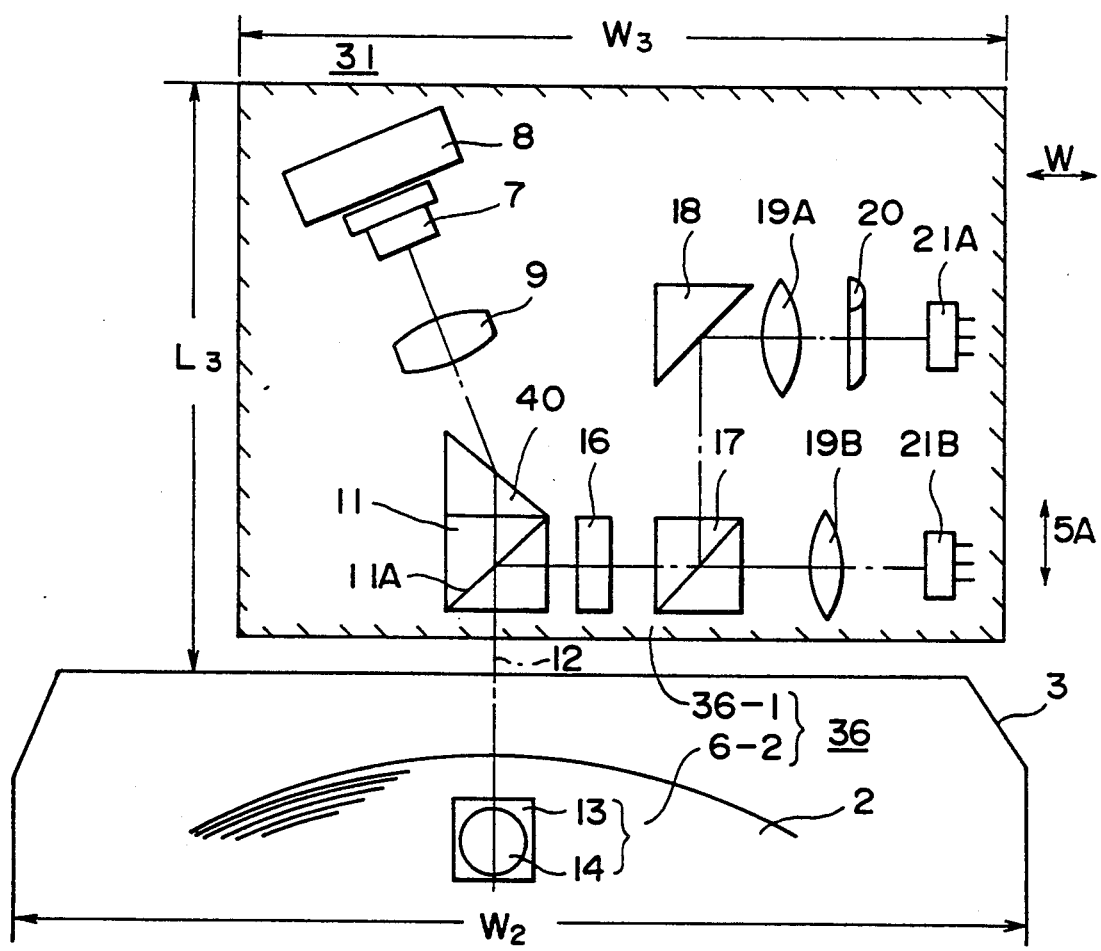

The present invention will now be described in detail with reference to the accompanying drawings.

Throughout the drawings, like reference numerals and letters are used to designate like or equivalent elements for the sake of simplicity of explanation.

The optical disc apparatus of the present invention achieves the above object by having an optical pickup used in a separate type of optical system wherein between the collimator lens and the beam splitter is provided an optical axis change device such as a total reflection prism so that the angle between an optical axis of emitted light from the semiconductor laser and an optical axis of light reflected from the moving unit is less than 90°.

A preferred embodiment according to the present invention, will be described by comparison with the conventional example already described and using the same conditions.

Figure 2A:
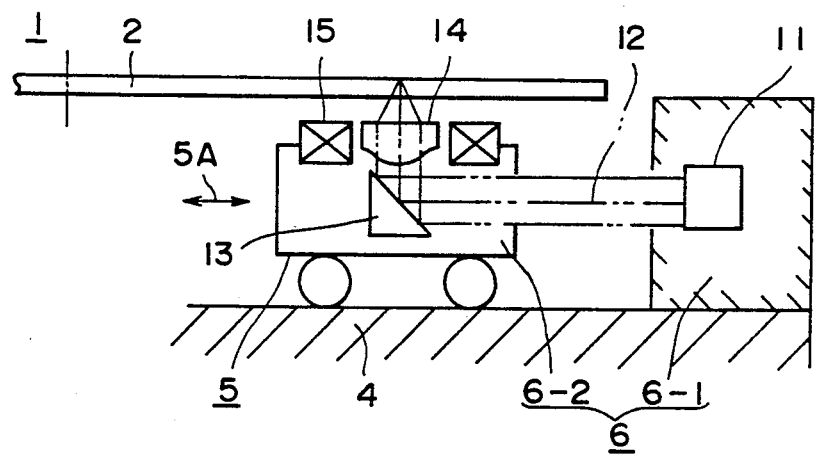
FIG. 2A and FIG. 2B are views similar to FIGS. 1A and 1B, respectively, which show the configuration of a preferred embodiment of the optical disc apparatus according to the present invention.
Figure 2B:
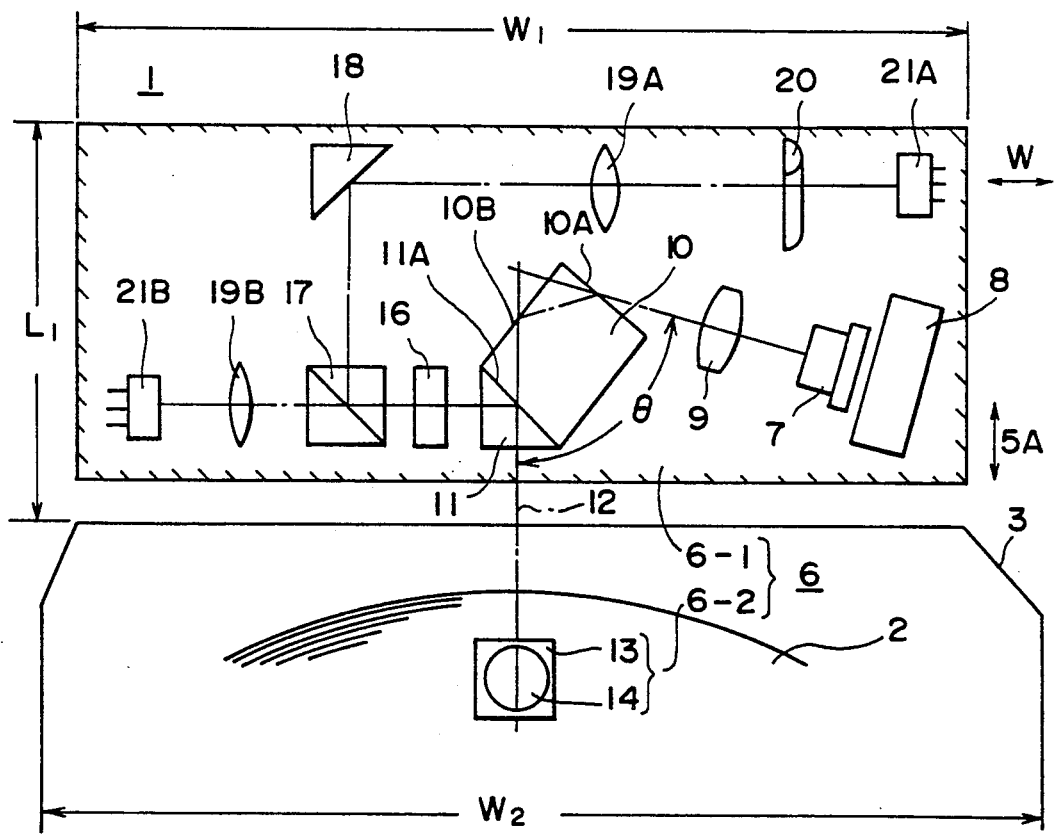

FIG. 2A and FIG. 2B show the configuration of the embodiment of the optical disc apparatus according to the present invention with FIG. 2A being a side view, and FIG. 2B being a plan view.

As shown in the figures, the optical disc apparatus 1 of the embodiment according to the present invention is configured from the opto-magnetic disc 2 housed in the cartridge 3, a base 4, and the optical pickup 6 comprising the feed apparatus 5, fixed unit 6-1 and the moving unit 6-2.

This optical disc apparatus 1 further comprises a compound prism 10 provided as a unit with a total reflection portion 10B that changes the optical axis direction of a light beam and a beam shaping portion 10A, and provided between the collimator lens 9 and a divided surface 11A of a beam splitter 11 (with the beam splitter 11 and the compound prism 10 of this embodiment being shown as a unit in the figure). When compared with the conventional disc apparatus 31, in the optical disc apparatus 1, the angle $\theta$ between the optical axis of the light beam emitted from the semiconductor laser 7 and the optical axis of the light beam reflected from the moving unit 6-2 is made less than 90°. Description of portions in the optical disc apparatus 1 that are the same as those of the conventional example will be omitted.

The light beam that is emitted from the collimator lens 9, is modified in its cross sectional shape in the beam shaping portion 10A in the same manner as for the beam shaping prism 40 in the conventional example described above, and emitted from the beam shaping portion 10A, totally reflected in the total reflection portion 10B, and then irradiated to the divided surface 11A of the beam splitter 11. More specifically, the direction of the optical axis of the light beam irradiated from the semiconductor laser 7 is changed to the direction of the optical axis of the light beam 12 and emitted from the fixed unit 6-1 of the optical pickup 6 which is fixed to the base 4, and the operation is the same as that of the conventional example.

Moreover, as shown in FIG. 2B, the angle $\theta$ is 68° for example. Also, both of the photodiodes 21A and 21B are configured so that they are each on opposite sides in the fixed unit 6-1 because of the direction of disposition of the total reflection prism 18.

In an optical disc apparatus 1 of the embodiment according to the present invention and having the configuration described above, the semiconductor laser 7 and the high-frequency superimposing circuit 8 in the fixed unit 6-1 of the optical pickup 6 is substantially inside the span in the direction of the width W and the direction of motion shown by the arrow 5A of the photodiodes 21A and 21B so that this fixed unit 6-1 is made compact. Furthermore, the length $L_1$ that the fixed unit 6-1 protrudes becomes smaller than the length $L_3$ in the case of the conventional embodiment, and the width $W_1$ of this fixed portion unit 6-1 is less than the width $W_2$ of the cartridge 3 or the diameter of the disc 2, so that the optical disc apparatus 1 can be made more compact.

Another preferred embodiment of the optical disc apparatus according to the present invention has the light receiving surfaces of both photodiodes, in the two systems of detection optical systems of the conventional optical disc apparatus, disposed so that they are parallel to an optical axis on the left and right of a light beam from the fixed unit and they face the optical axis.

FIG. 3 is a plan view that shows the configuration of an opto-magnetic disc apparatus that is the other preferred embodiment of the optical disc apparatus according to the present invention.

The side view showing the configuration of this further embodiment of the optical disc apparatus according to the present invention is the same as that of FIG. 2A.

Adopting condenser lenses 23A and 23B and a cylindrical lens 20B on this further embodiment are the only differences from the first embodiment. Description of portions in the other embodiment that are the same as those of the first embodiment will be omitted.

In FIG. 3, the light beam reflected by the polarization beam splitter 17, is reflected by the total reflection prism 18 (where this total reflection prism 18 is disposed so that it performs full reflection in the direction that is relatively opposite that of the case of the conventional example described above is led to one of the detection optical systems comprising a condenser lens 23A that has a large focussing distance, a cylindrical lens 20A and the four-divided photodiode 21A, and the light beam that passes through the polarization beam splitter 17 is led to the other of the detection optical system comprising a condenser lens 23B that has a small focussing distance like the condenser lens in the conventional apparatus, a cylindrical lens 20B that has a small focussing distance when compared to the cylindrical lens 20A and the four-divided photodiode 21B.

More specifically, these four-divided photodiodes 21A and 21B are configured so that because of the direction of disposition of the total reflection prism 18, they are disposed on respectively opposite sides to the left and right sides inside the fixed unit 6-1, as shown in FIG. 3. These two systems of detection optical systems are disposed on the right and left of the light beam and between the optical beam splitter 17 and the total reflection prism 18 so that it is possible to use a large focussing distance for the condenser lens 23A in one of the detection optical systems.

Then, in the same manner as in the case of the conventional embodiment, the difference between the detection signals of the four-divided photodiodes 21A and 21B generates the reproduction RF signals, and these detection signals from the four-divided photodiode 21A generate a focus servo signal.

As described above, the reason for the use of the four-divided photodiode 21B in the other detection optical system for RF signal detection is in order to obtain a reproduction RF signal of high accuracy for the photodiode of the other detection optical system and under the same conditions for the four-divided photodiode 21A of the first detection optical system and, more specifically, in order to cancel the influence of the cross-shaped insensitive zone in the four-divided photodiode 21A so that the output characteristics can be in agreement.

Also, the reason for the use of the four-divided photodiode 21B and the cylindrical lens 20B in the other detection optical system described above is so that the diameter of the light spot on the light receiving surface of the four-divided photodiode 21A can be made in agreement with the diameter of the light spot on the light receiving surface of the four-divided photodiode 21B when there is a just-focussed situation, and so that when the two are equal the output of the four-divided photodiode 21B can be used as the basis for adjustment of the position of the four-divided photodiode 21B and the cylindrical lens 20B and the focussing lens 20.

When compared to a conventional optical disc apparatus, the further embodiment, according to the present invention and having the configuration described above, has two systems of detection optical systems of the four-divided photodiodes 21A and 21B disposed on relatively opposite sides in the fixed unit 6-1 of the optical pickup 6 with the condenser lens 23A in one of the detection optical systems using a large focussing distance. So it is possible for the width $W_1$ of the fixed unit 6-1 to be contained within the range of the width $W_2$ of the cartridge 3, and it is possible for the disc apparatus 1 to be made more compact and for the accuracy of the focus servo operation to be increased. In addition four-divided focus diodes 21A and 21B are respectively used for the two systems of detection optical systems and so reproduction RF signals of high accuracy can be obtained. Furthermore, the use of the four-divided photodiode 21B and the cylindrical lens 20B in the other of the optical detection systems facilitates the adjustment of this optical detection system and improves the detection accuracy.

While the presently preferred embodiments of the present invention have been shown and described, it is to be understood that these disclosures are for the purpose of illustration and that various changes and modifications may be made without departing from the scope of the invention as set forth in the appended claims.

I claim:

1. In an optical apparatus having a semiconductor laser for emitting a laser beam, a beam splitter receiving said laser beam and transmitting said laser beam towards an optical disc, and at least one detection system for detecting information carried by a reflected laser beam reflected from said optical disc, the improvement comprising:
    a laser beam direction changing device disposed between said semiconductor laser and said beam splitter for changing a first propagating direction of said laser beam emitted from said semiconductor laser towards said beam splitter into a changed propagating direction so that the direction of the laser beam changes at least 90° around an intersection point of a first optical axis of said laser beam emitted from said semiconductor laser and a second optical axis of said laser beam transmitted by said beam splitter, and so that said changed propagating direction becomes equal to a second propagating direction of said laser beam transmitted by said beam splitter.

2. The apparatus as claimed in claim 1, wherein said laser beam direction changing device comprises:
    shaping means for shaping the cross-section of said laser beam emitted from said semiconductor laser into a circular shape; and
    total reflection means for totally reflecting said laser beam of circular shape.

3. An optical apparatus as claimed in claim 1 and further comprising:
    two signal detection systems having respective optical detecting means for detecting information carried by a reflected laser beam reflected from said optical disc.

4. The apparatus as claimed in claim 3, wherein said laser beam direction changing device comprises:
    shaping means for shaping the cross-section of said laser beam emitted from said semiconductor laser into a circular shape; and
    total reflection means for totally reflecting said laser beam of circular shape.

5. An optical apparatus having a semiconductor laser for emitting a laser beam, a beam splitter receiving a section of said laser beam emitted from said semiconductor laser and transmitting said laser beam towards an optical disc, said beam splitter guiding a reflected laser beam reflected from said optical disc to two signal detection systems having optical detecting means for detecting information carried by said reflected laser beam, respectively, the improvement comprising:

a laser beam direction changing device disposed between said semiconductor laser and said beam splitter for changing a first propagating direction of said laser beam emitted from said semiconductor laser towards said beam splitter into a changed propagating direction so that the direction of the laser beam changes at least 90° around an intersection point of a first optical axis of said laser beam emitted from said semiconductor and a second optical axis of said laser beam transmitted by said beam splitter, and so that said changed propagating direction becomes equal to a second propagating direction of said laser beam transmitted by said beam splitter;

said optical detecting means of said two signal detection systems comprising, respectively, flat light receiving surfaces disposed so that said respective flat light receiving surfaces face each other and are situated on opposite sides of and are parallel to a third optical axis of said reflected laser beam reflected from said laser disc, respectively.

6. The apparatus as claimed in claim 5, wherein:
each of said flat light receiving surfaces is divided into four portions, each of said four portions detecting said reflected laser beam reflected from said optical disc.

7. The apparatus as claimed in claim 5, wherein:
said detecting means of each of said two signal detection systems comprises a condenser lens and a cylindrical lens, the condenser lens of one of said detecting means having a focal distance longer than the focal distance of the condenser lens of the other of said detecting means.

8. The apparatus as claimed in claim 6, wherein:
said detecting means of each of said two signal detection systems comprises a condenser lens and a cylindrical lens, the condenser lens of one of said detecting means having a focal distance longer than the focal distance of the condenser lens of the other of said detecting means.

9. In an optical apparatus having a semiconductor laser for emitting a laser beam, and a beam splitter for receiving a section of said laser beam emitted from said semiconductor laser and guiding said laser beam towards an optical disc, said beam splitter guiding a reflected laser beam reflected from said optical disc to two detection systems having optical detecting means for detecting information carried by said reflected laser beam, respectively, the improvement comprising:

laser beam direction changing means disposed between said semiconductor laser and said beam splitter for changing the direction of said laser beam emitted from said semiconductor laser so that a first optical axis of said laser beam emitted from said semiconductor laser and a second optical axis of said reflected laser beam reflected from said optical disc form an angle less than 90°.

said optical detecting means of said two detection systems comprising, respectively, flat light receiving surfaces disposed so that said respective flat light receiving surfaces face each other and are situated on opposite sides of and are parallel to said second optical axis of said laser beam reflected from said optical disc.

10. The apparatus as claimed in claim 9, wherein:
each of said flat light receiving surfaces is divided into four portions, each of said four portions detecting said reflected laser beam reflected from said optical disc.

11. The apparatus as claimed in claim 9, wherein:
said detecting means of each of said two signal detection systems comprises a condenser lens and a cylindrical lens, the condenser lens of one of said detecting means having a focal distance longer than the focal distance of the condenser lens of the other of said detecting means.

12. The apparatus as claimed in claim 10, wherein:
said detecting means of each of said two signal detection systems comprises a condenser lens and a cylindrical lens, the condenser lens of one of said detecting means having a focal distance longer than the focal distance of the condenser lens of the other of said detecting means.

* * * * *